United States Patent  [10] Patent No.: US 6,922,690 B2
Loya et al.                [45] Date of Patent:    Jul. 26, 2005

(54) SYSTEM AND METHOD FOR CREATING A DATUM REFERENCE FRAME (75) Inventors: John L. Loya, Rancho Santa Magarita, CA (US); Jeff M. Duke, Huntington Beach, CA (US); David M. Kailiponi, Cypress, CA (US)

(73) Assignee: UGS Corp., Plano, TX (US)

( * ) Notice: Subject to any disclaimer, the term of this patent is extended or adjusted under 35 U.S.C. 154(b) by 428 days.

(21) Appl. No.: 10/061,683
(22) Filed: Feb. 1, 2002

(65) Prior Publication Data
US 2003/0158833 A1 Aug. 21, 2003

(51) Int. Cl.[7] .............................................. G06F 17/30
(52) U.S. Cl. ........................................ 707/3; 707/102
(58) Field of Search ................. 707/1–10, 100–104.1, 707/200–206; 345/473

(56) References Cited
U.S. PATENT DOCUMENTS 6,535,215 B1 * 3/2003 DeWitt et al. .............. 345/473
6,629,097 B1 * 9/2003 Keith ............................ 707/5

* cited by examiner

Primary Examiner—Mohammad Ali
(74) Attorney, Agent, or Firm—Baker Botts LLP (57) ABSTRACT A system and method for creating a datum reference frame includes selecting a first datum, wherein the first datum comprises a plurality of faces. A first definition for the selected first datum is determined. One or more second datums, based on the determined first definition, are automatically determined, wherein the second datum comprises a plurality of faces. The second datum is selected. A second definition for the selected second datum is determined. One or more third datums based on the determined second definition, wherein the third datum comprises a plurality of faces, are automatically determined. The third datum is selected.

28 Claims, 5 Drawing Sheets

SYSTEM AND METHOD FOR CREATING A DATUM REFERENCE FRAME

TECHNICAL FIELD OF THE INVENTION

The present invention relates generally to the data processing industry and, more particularly, to a system and method for creating a datum reference frame.

BACKGROUND OF THE INVENTION

Engineering data management systems and computer aided design systems provide useful environments for designers of mechanical components to specify the physical characteristics and configurations of various features. Sophisticated computer aided design systems have also been able to provide designers with the ability to specify other information related to the construction and testing of these components. For example, some sophisticated computer aided design systems allow for the designer to specify the type of material to be used to construct a particular component, the tolerances associated with various dimensions of the feature, processing techniques to be used to manufacture the component and other characteristics associated with the manufacture, testing, or use of components of the assembly.

Currently, CAD systems allow the user to restrict the feature's degree of freedom by using a datum in a tolerance. Datums are generally compiled in datum reference frames. Present systems allow any datums to be selected to populate a datum reference frame.

SUMMARY OF THE INVENTION

Accordingly, a need has arisen for a computer aided design system and method of operation that allows a datum reference frame to be created from a valid partial or full set of datums.

In accordance with one embodiment of the present invention, a method for creating a datum reference frame includes selecting a first datum, wherein the first datum comprises a plurality of faces. A first definition for the selected first datum is determined. One or more second datums, based on the determined first definition, are automatically determined, wherein the second datum comprises a plurality of faces. The second datum is selected. A second definition for the selected second datum is determined. One or more third datums based on the determined second definition, wherein the third datum comprises a plurality of faces, are automatically determined. The third datum is selected.

Technical advantages of one or more embodiments of the present invention include allowing the reuse of the datum reference frame. Another technical advantage might be the ability to create a partial datum reference frame. Yet another technical advantage might be allowing a set of datum targets to define a datum and be included in the datum reference frame.

These and elsewhere described technical advantages may be present in some, none, or all of the embodiments of the present invention. In addition, other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
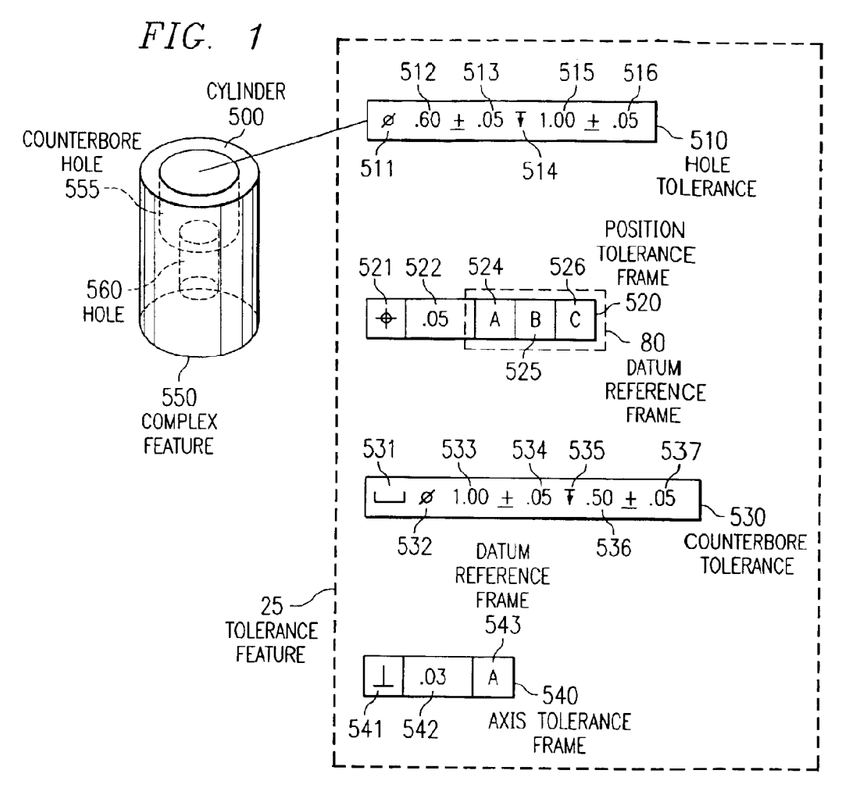
FIG. 1 is a block diagram illustrating a datum reference frame in a CAD system in accordance with one embodiment of the present invention.

FIG. 1 is a block diagram illustrating a datum reference frame 80 for a complex feature 550 in a CAD system in accordance with one embodiment of the present invention. FIG. 1 includes cylinder 500, complex feature 550, and tolerance feature 25. Cylinder 500 is exemplary of any material or shape in which a part may be designed to fit in or be related to.

Complex feature 550 includes two features, counterbore hole 555 and hole 560. As used herein, a "feature" is a physical portion of a part, including surface, pin, tab, hole, or slot. A "complex feature" is created when a first feature is associated with one or more additional features. For example, complex feature 550 is an association of counterbore hole 555 with hole 560. It will be understood that complex feature 550 is for exemplary purposes only and may represent any complex feature that includes two or more associated features. Furthermore, the features may be associated in any order or with any number of other features.

A "datum" is a theoretically specific axis or plane that restricts a degree of freedom of a feature. For example, the central vertical axis of hole 560 may be used as a datum for counterbore hole 555, thus restricting the tilt angle of counterbore hole 555 to a vertical angle. In one embodiment, the datum reference frame 80 is a logical relation of datums that assist the system in defining a tolerance for the complex feature 550. A "tolerance" may be a set of instructions on how a related feature is manufactured or inspected. For example, a depth tolerance for counterbore hole 555 may include the desired depth of 0.5 inches and the limited variation of 0.05 inches. This leaves the acceptable range for the depth of counterbore hole 555 to be from 0.45 inches to 0.55 inches.

Each datum may include a datum feature or a plurality of datum targets. A "datum feature" is a physical portion of a part that is used as a restriction on degree of freedom. For example, a datum feature may comprise a plane, a slot, a pin, a tapered pin, an elongated hole, a torus, a ball/socket, revolved, bounded, a thickness, or any other feature capable of restricting a degree of freedom. In this embodiment, a datum feature might be the plane comprising the top of cylinder 500. This plane restricts the vertical movement of counterbore hole 555 along a vertical axis perpendicular to the plane. Each datum feature includes a plurality of faces that may represent the sides of the feature. The "datum target" is a defined geometric point, line or area in space that may be used to define a datum. For example, three datum target points are required to define a plane and two datum target points are required to define an axis to be used as a datum. Once defined, the datum defined by the targets generating the plane may then be used to restrict the vertical movement of counterbore hole 555 along a vertical axis perpendicular.

Further, each datum requires either a theoretically specific plane or axis. The plane or axis may be inferred from either the datum feature faces, from the datum targets, or specified by the user. The datum feature or datum targets that comprise the datum may only define one theoretically specific plane or axis, called the "definition." For example, as described above, the central vertical axis of hole 560 may be used as a datum for counterbore hole 555. In this example, the central vertical axis is the definition of the datum feature, hole 560. It will be understood that a datum may be defined by a function, data structure, or any other logic that might restrict a degree of freedom of any feature, complex or simple.

Figure 3:
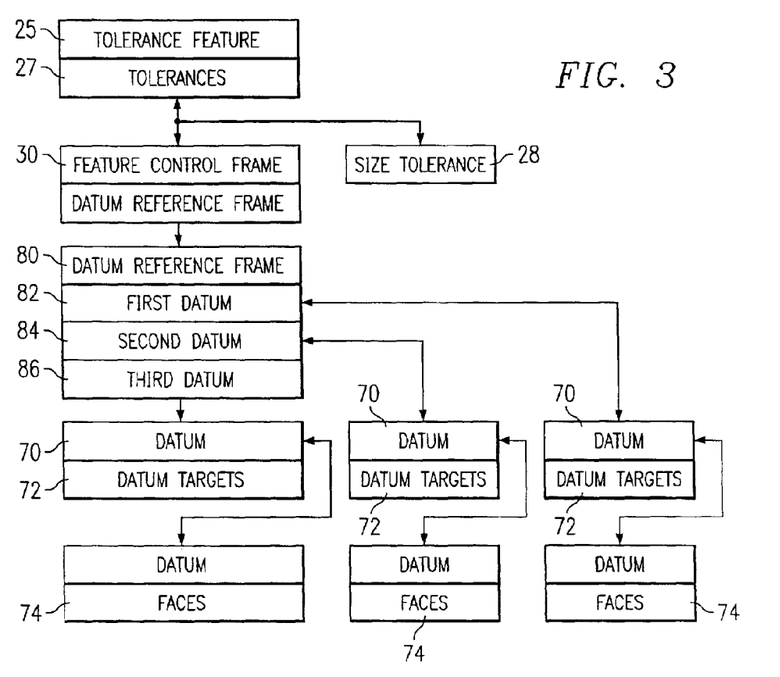
FIG. 3 is a block diagram illustrating a datum reference frame in accordance with one embodiment of the present invention.

As shown in FIG. 3, tolerance feature 25 may be a data structure that includes one or more tolerances 27 that are logically related to complex feature 550. Each tolerance 27 may be a size tolerance 28 or a feature control frame 30. In this embodiment, a user interface displays an example tolerance feature 25 that includes hole tolerance 510, position tolerance frame 520, counterbore tolerance 530, and axis tolerance frame 540. It will be understood that tolerance feature 25 is for exemplary purposes only and may include any number of tolerances 27, in any suitable format, and in any suitable order.

Hole tolerance 510 represents one embodiment of size tolerance 28. Hole tolerance 510 includes diameter icon 511, diameter 512, diameter tolerance 513, depth icon 514, depth 515, and depth tolerance 516. In this embodiment, the depth 515 is determined from the top of cylinder 500 to the bottom plane of hole 560. In another embodiment, depth 515 could be determined from the bottom plane of counterbore hole 555 to the bottom plane of hole 560.

Position tolerance frame 520 represents one embodiment of the feature control frame 30 in FIG. 3. Position tolerance frame 520 includes position icon 521, position tolerance 522, and datum reference frame 80. There are a variety of formats and datums that may be included in datum reference frame 80.

Counterbore tolerance 530 includes counterbore icon 531, diameter icon 532, diameter 533, diameter tolerance 534, depth icon 535, depth 536, and depth tolerance 537. Counterbore tolerance 530 is for exemplary purposes only and any suitable tolerance 27 may be used.

Axis tolerance frame 540 includes axis icon 541, axis tolerance 542, and an exemplary partial datum reference frame 543. Partial datum reference frame 543 includes one datum that may include a plane from which axis tolerance 542 may be measured. In another example, partial datum reference frame 543 may include the axis that is to be measured.

Figure 2:
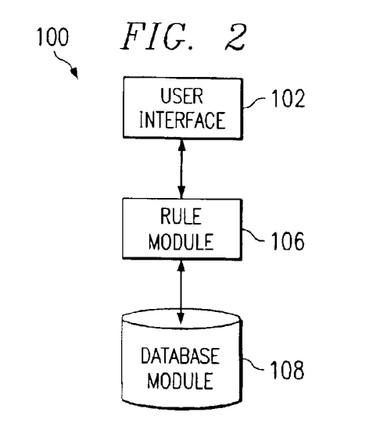
FIG. 2 is a block diagram illustrating a system for creating a datum reference frame in accordance with one embodiment of the present invention.

FIG. 2 is a block diagram illustrating a system 100 for creating a datum reference frame in accordance with one embodiment of the present invention. System 100 includes user interface 102, rule mode 106, and database module 108. User interface 102 is communicably connected to rule module 106. Rule module 106 is communicably connected to database module 108. It will be understood that system 100 contemplates that the user interface 102, the rule mode 106, and the database module 108 may individually or jointly reside on one or more computer systems, whether workstations or servers. According to one embodiment of the present invention, system 100 may comprise a portion of a computer aided design (CAD) system or an engineering data management system. CAD systems are ordinarily associated with the design of an assembly whereas engineering data management systems are ordinarily associated with the management of design data and related parameters after design, during, for example, manufacture or testing of the assembly. In these embodiments, the user interface 102 is operable to present graphical images of components of assemblies which are designed, modeled, or managed using the system 100.

User interface 102 is operable to display data and receive commands from a user who is interfacing with system 100. User interface 102 may comprise a software application or a portion of a data processing system that may include a computer screen, computer keyboard, and a pointing device such as a mouse or a track ball. Using these systems, a graphical display can be presented to a user and the user can type in commands or terms and use the pointing device to select active portions of the screen to institute actions or select items on the screen.

Rule module 106 includes objects, methods, functions, or any other logic that may manipulate tolerance features and datum reference frames. In one embodiment of the present invention, rule module 106 may examine a feature selected at user interface 102 and gather the surface, datum, and target information for the selected feature. In this or another embodiment, the rule module 106 may use geometry or any other data to infer a plane or axis for any one of the datums of the selected feature.

Database module 108 includes computer records that may be generally identified by tables. It will be understood that the computer records may be otherwise combined and/or divided within the scope of the present invention. In this embodiment of the present invention, database module 108 includes data defining basic surface geometry of a plurality of features.

FIG. 3 is a block diagram illustrating a datum reference frame 80 in accordance with one embodiment of the present invention. In one embodiment of the present invention, a tolerance feature 25 includes one or more tolerances 27. Each of the tolerances 27 may include a size tolerance 28 or a feature control frame 30. Size tolerance 28 includes a tolerance type, such as diameter or depth, a desired quantitative measurement for the tolerance type, and a tolerance value. The feature control frame 30 may include the datum reference frame 80.

Datum reference frame 80 may include first datum 82, second datum 84, and third datum 86. Datum reference frame 80 may be any data object capable of representing one or more datums. For example, datum reference frame 80 may be a partial datum reference frame 80, meaning that datum reference frame 80 includes less than three datums. A full datum reference frame 80 includes three or more datums.

In one embodiment of the present invention, first datum 82, second datum 84, and third datum 86 may all include one of a plurality of features. For example, first datum 82, second datum 84, and third datum 86 may each be a plane, a slot, a pin, a tapered pin, an elongated hole, a torus, a ball/socket, revolved, bounded, a thickness, or any other feature capable of restricting a degree of freedom. Each feature might have a different amount and set of faces 74. In another embodiment of the present invention, first datum 82, second datum 84, and third datum 86 may each be defined by a plurality of targets 72. Target 72 may be a geometric point, line or area.

In operation, a user might create a complex feature 550 and associate tolerance feature 25 with the complex feature 550. The user might begin by adding one or more tolerances 27 to tolerance feature 25. One tolerance 27 of tolerance feature 25 might include a size tolerance 28 or it might include a feature control frame 30. Feature control frame 30 includes datum reference frame 80, which will include one or more of first datum 82, second datum 84, and third datum 86.

For example, the user might select a first datum feature as datum 70. The datum 70 now includes a plurality of faces 74 used to define a plane or an axis as the first definition. The datum reference frame 80 is populated with datum 70, now categorized as first datum 82. Based on the first definition of the first datum, the user is then presented with a set of valid second datums 84. From this set, the user might select a second datum 70 by defining two or more datum targets 72. The datum targets 72 might define a second plane as the second definition. The second datum 70 is then incorporated into datum reference frame 80 as second datum 84. Next, based on the first definition and the second definition, the user is presented with a set of valid third datums 86. The user might select a feature, including one or more faces 74, that includes an axis as a third definition for a third datum 70. Datum 70 might then be included in datum reference frame 80 as third datum 86. In another example, the user might select only a first datum 82 for datum reference frame 80. Second datum 84 and third datum 86 might then not populated by the user and a partial datum reference frame would result.

Figure 4:
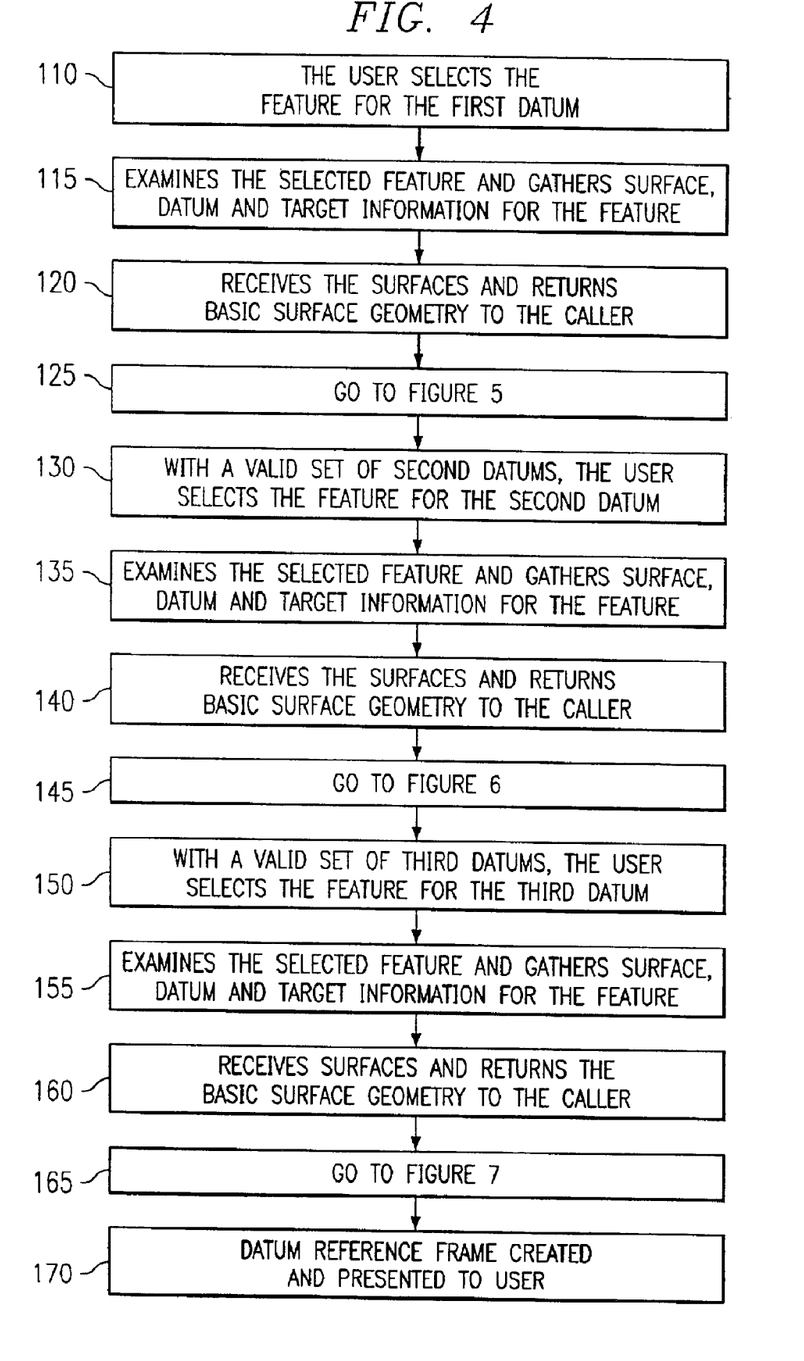
FIG. 4 is a flow diagram illustrating a method for creating the datum reference frame of FIG. 3 in accordance with one embodiment of the present invention.

FIG. 4 is a flow diagram illustrating a method for creating the datum reference frame 80 in accordance with one embodiment of the present invention.

At step 110, a user selects a first feature for the first datum 82 at the user interface level 102. As described in FIG. 3, the selected first feature may be may be a plane, a slot, a pin, a tapered pin, an elongated hole, a torus, a ball/socket, revolved, bounded, a thickness, or any other feature capable of restricting a degree of freedom. Next, at step 115, the first feature is examined and the faces and target information for the feature is gathered in the rule module 106. Next, the information is communicated to the database module 108 that determines the basic surface geometry at step 120.

Figure 5:
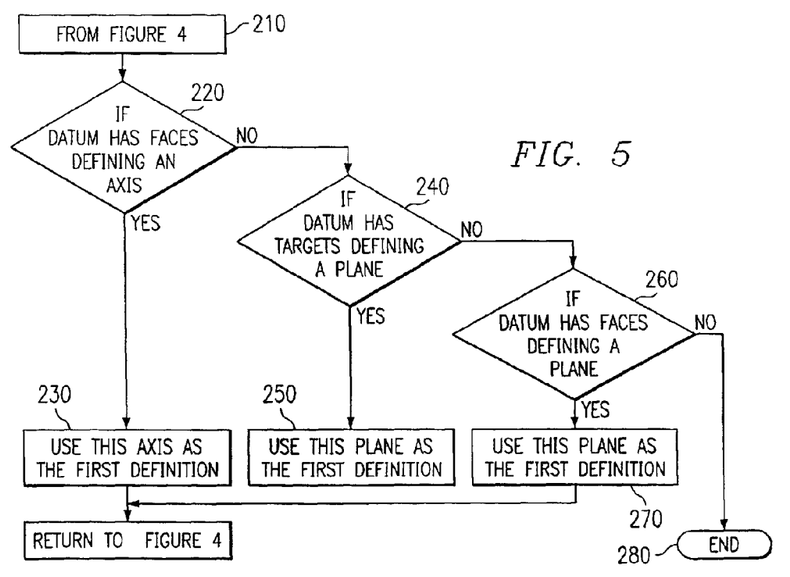
FIG. 5 is a flow diagram illustrating a method for selecting a first definition of the datum reference frame of FIG. 3 in accordance with one embodiment of the present invention.

At step 125, the rule module 106 uses the basic surface geometry to select a first definition for the first datum 82 as illustrated in FIG. 5 in accordance with one embodiment of the present invention. In FIG. 5, the method determines if the first datum 82 includes faces 74 that define an axis at decisional step 220. If the axis exists, then the axis is used as the first definition for the first datum 82 at step 230.

If there are no faces 74 defining an axis, the method determines if the first datum 82 has datum targets that define a plane in decisional step 240. In step 250, if the plane is defined by datum targets, then the datum targets are used as the first definition.

If the first datum 82 does not include targets that define a plane, then the method proceeds to step 260. At step 260, the method determines if the first datum 82 includes faces 74 that define a plane. If the first datum 82 includes faces 74 that define a plane, then the plane is used as the first definition at step 270. If no first definition is found, then the method ends at step 280. However, if the first definition is found for the first datum 82 at step 270, then the method returns to FIG. 4. The first definition allows for a set of valid second datums 84 to be determined and communicated to user interface level 102.

From the valid set of second datums 84, the user selects a second feature for the second datum 84 reference at step 130. As described in FIG. 3, the selected second feature may be may be a plane, a slot, a pin, a tapered pin, an elongated hole, a torus, a ball/socket, a revolved, a bounded, a thickness, or any other feature capable of restricting a degree of freedom. Next, at step 135, the selected second feature is examined and the faces, datum, and target information for the feature are gathered in rule module 106. Next, the information is communicated to the database module 108 that determines the basic surface geometry at step 140.

Figure 6:
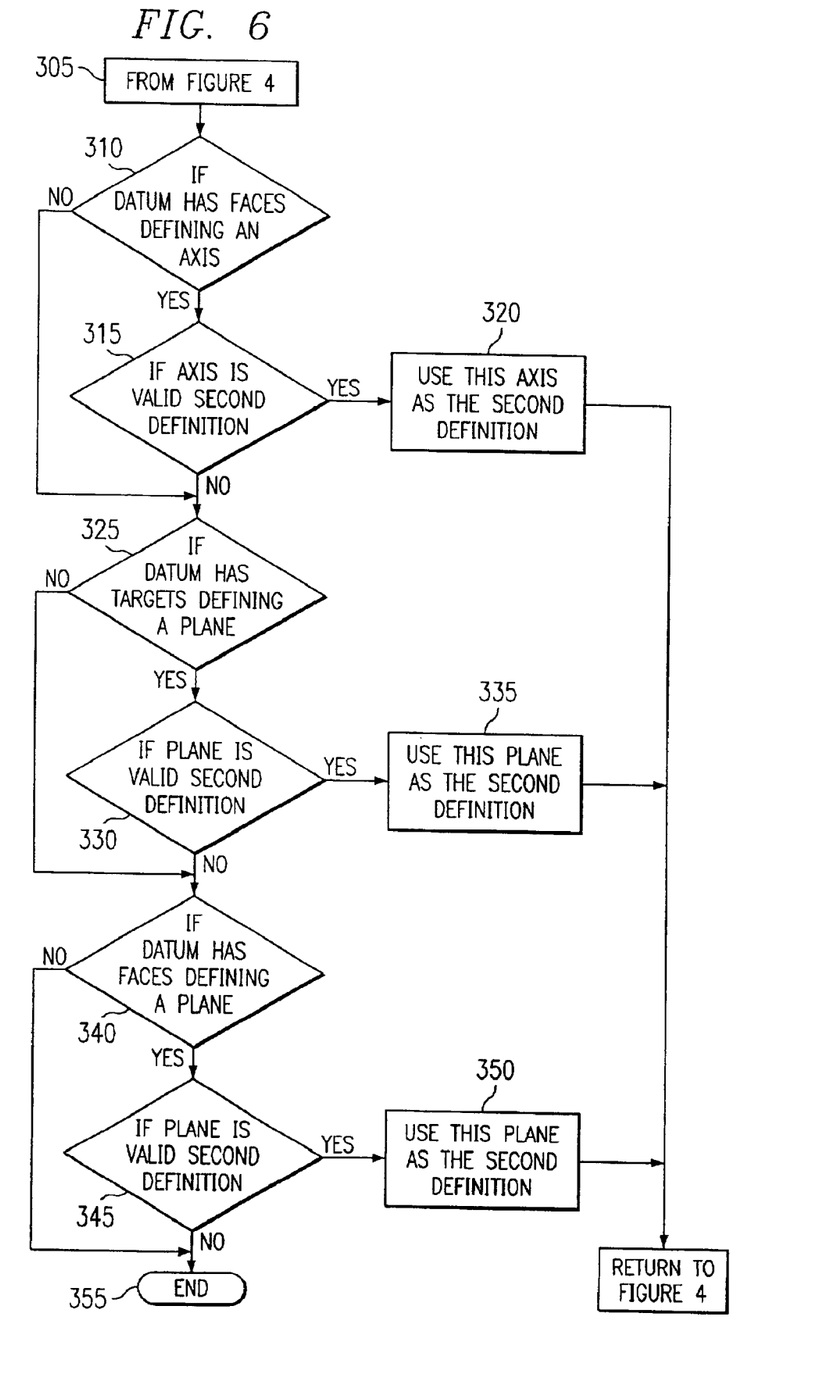
FIG. 6 is a flow diagram illustrating a method for selecting a second definition of the datum reference frame of FIG. 3 in accordance with one embodiment of the present invention.

At step 145, the method uses the data to select a second definition for the second datum 84 as illustrated in FIG. 6 in accordance with one embodiment of the present invention. In FIG. 6, the method determines if the second datum 84 includes faces 74 that define an axis at decisional step 310. If the axis exists, then at step 315 it is determined if the axis is a valid second definition. If the axis is the valid second definition, the axis is used as the second definition for the second datum 84 at step 320.

If there are no faces 74 defining an axis or if the axis is not valid, the method determines if the second datum 84 has datum targets that define a plane in decisional step 325. If the plane exists, then at step 330 it is determined if the plane is a valid second definition. If the plane defined by datum targets is valid, the plane is used as the second definition at step 335.

If the second datum 84 does not include targets that define a plane or the plane is not valid, then the method proceeds to step 340. At step 340, the method determines if the second datum 84 includes faces 74 that define a plane. If the plane exists, then at step 345 it is determined if the plane is a valid second definition. If the plane defined by the faces 74 is valid, then the plane is used as the second definition at step 350. If no valid second definition is found, then the method ends at step 355. However, if the second definition is found for the second datum 84, then the method returns to FIG. 4. The second definition allows for a set of valid third datums 86 to be determined.

At step 150, a user selects a third feature, from the set of valid third datums, for the third datum at the user interface level 102. As described in FIG. 3, the selected third feature may be may be a plane, a slot, a pin, a tapered pin, an elongated hole, a torus, a ball/socket, a revolved, a bounded, a thickness, or any other feature capable of restricting a degree of freedom. Next, at step 155, the selected third feature is examined and the faces, datum, and target information for the feature are gathered in rule module 106. Next, the information is communicated to the database module 108 that determines the basic surface geometry at step 160.

Figure 7:
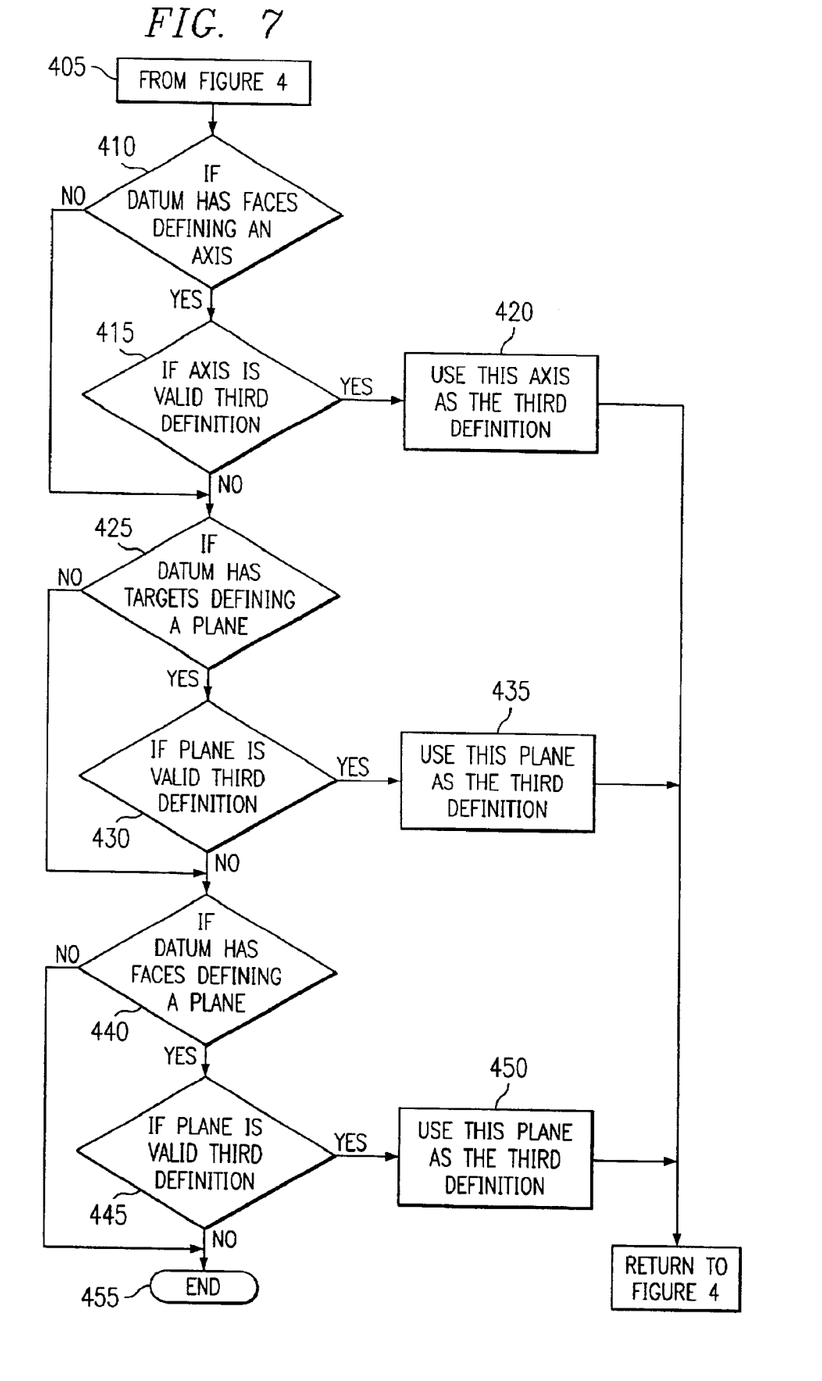
FIG. 7 is a flow diagram illustrating a method for selecting a third definition of the datum reference frame of FIG. 3 in accordance with one embodiment of the present invention.

At step 165, the method uses the data to select a third definition for the third datum 86 as illustrated in FIG. 5 in accordance with one embodiment of the present invention. In FIG. 7, the method determines if the third datum 86 includes faces 74 that define an axis at decisional step 410.

If the axis exists, then at step 415 it is determined if the axis is a valid third definition. If the axis is the valid third definition, the axis is used as the third definition for the third datum 86 at step 420.

If there are no faces 74 defining an axis or if the axis is not valid, the method determines if the third datum 86 has datum targets that define a plane in decisional step 425. If the plane exists, then at step 430 it is determined if the plane is a valid third definition. If the plane defined by datum targets is valid, the plane is used as the third definition at step 435.

If the third datum 86 does not include targets that define a plane or the plane is not valid, then the method proceeds to step 440. At step 440, the method determines if the third datum 86 includes faces 74 that define a plane. If the plane exists, then at step 445 it is determined if the plane is a valid third definition. If the plane defined by the faces 74 is valid, then the plane is used as the third definition at step 450. If no valid third definition is found, then the method ends at step 455. However, if the third definition is found for the third datum 86, then the method returns to FIG. 4. Finally, at step 170 in FIG. 4, the three datums are compiled and used to create datum reference frame 80.

In one embodiment of the present invention, the rules for validity of the second datum 84 are based on the first datum 82. In turn, the rules for validity of the third datum 86 are based on the first datum 82 and second datum 84. An exemplary table is shown below, where "dot( )" comprises a function determining the scalar product of two geometric objects.

| First | Second | Third | Exemplary Rules for Validity |
|---|---|---|---|
| Plane | * | * | VALID |
| Axis | * | * | VALID |
| Plane (P1) | Plane (P2) | * | dot(normal(P1), normal (P2)) == 0 |
| Axis (A1) | Plane (P1) | * | dot(A1, normal(P1)) == {0, 1 or −1} |
| Plane (P1) | Axis (A1) | * | dot(A1, normal(P1)) == {0, 1 or −1} |
| Axis (A1) | Axis (A2) | * | dot(A1, A2) == 0 OR dot(A1, A2) == {1 or −1} AND !coaxial (A1, A2) |
| Plane (P1) | Plane (P2) | Plane (P3) | dot(normal(P1), normal(P2)) == 0 AND dot(normal(P2), normal (P3)) == 0 AND dot(normal(P1), normal (P3)) == 0 |
| Axis (A1) | Plane (P1) | Plane (P2) | dot(normal(P1), normal(P2)) == 0 AND dot(A1, normal (P1)) == 0 AND dot(A1, normal (P2)) == {1 or −1} OR dot(normal(P1), normal(P2)) == 0 AND dot(A1, normal (P1)) == {1 or −1} AND dot(A1, normal (P2)) == 0 |
| Plane (P1) | Axis (A1) | Plane (P2) | dot(normal(P1), normal(P2)) == 0 AND dot(A1, normal (P1)) == 0 AND dot(A1, normal (P2)) == {1 or −1} OR dot(normal(P1), normal(P2)) == 0 AND dot(A1, normal (P1)) == {1 or −1} AND dot(A1, normal (P2)) == 0 |
| Axis (A1) | Axis (A2) | Plane (P1) | dot(A1, A2) == 0 AND dot(A1, normal (P1)) == 0 AND dot(A1, normal (P2)) == {1 or −1} OR dot(A1, A2) == 0 AND dot(A1, normal (P1)) == {1 or −1} AND dot(A1, normal (P2)) == 0 OR dot(A1, A1) == {1 or −1} AND !coaxial(A1, A2) AND dot(A1, normal(P1)) == {1 or −1} AND dot(A1, normal (P2)) == {1 or −1} |
| Plane (P1) | Plane (P2) | Axis (A1) | dot(normal(P1), normal(P2)) == 0 AND dot(A1, normal (P1)) == 0 AND dot(A1, normal (P2)) == {1 or −1} OR dot(normal(P1), normal(P2)) == 0 AND dot(A1, normal (P1)) == {1 or −1} AND dot(A1, normal (P2)) == 0 |
| Axis (A1) | Plane (P1) | Axis (A2) | dot(A1, A2) == 0 AND dot(A1, normal (P1)) == 0 AND dot(A1, normal (P2)) == {1 or −1} OR dot(A1, A2) == 0 AND dot(A1, normal (P1)) == {1 or −1} AND dot(A1, normal (P2)) == 0 OR dot(A1, A1) == {1 or −1} AND !coaxial(A1, A2) AND dot(A1, normal(P1)) == {1 or −1} AND dot(A1, normal (P2)) == {1 or −1} |
| Plane (P1) | Axis (A1) | Axis (A2) | dot(A1, A2) == 0 AND dot(A1, normal (P1)) == 0 AND dot(A1, normal (P2)) == {1 or −1} OR dot(A1, A2) == 0 AND dot(A1, normal (P1)) == {1 or −1} AND dot(A1, normal (P2)) == 0 OR dot(A1, A1) == {1 or −1} AND !coaxial(A1, A2) AND dot(A1, normal(P1)) == {1 or −1} AND dot(A1, normal (P2)) == {1 or −1} |
| Axis (A1) | Axis (A2) | Axis (A3) | NOT VALID |

Although the present invention has been described in detail, it should be understood that various changes, substitutions and alterations can be made hereto without departing from the sphere and scope of the invention as defined by the appended claims.

To aid the Patent Office, and any readers of any patent issued on this application in interpreting the claims appended hereto, applicants wish to note that they do not intend any of the appended claims to invoke ¶ 6 of 35 U.S.C. § 112 as it exists on the date of filing hereof unless "means for" or "step for" are used in the particular claim.

What is claimed is:

1. A computer-implemented method for creating a datum reference frame, comprising:
   selecting a first datum, wherein the first datum comprises a plurality of faces;
   determining a first definition for the selected first datum;
   automatically determining a set of one or more valid second datums based on the determined first definition, wherein the second datum comprises a plurality of faces;
   selecting the second datum from the set of valid second datums;
   determining a second definition for the selected second datum;
   automatically determining a set of one or more valid third datums based on the determined second definition, wherein the third datum comprises a plurality of faces; and
   selecting the third datum from the set of valid third datums.

2. The method of claim 1, wherein determining the first definition for the selected first datum comprises:
   determining the existence of one or more faces comprising an axis; and
   selecting the axis as the first definition.

3. The method of claim 1, wherein determining the second definition for the selected second datum comprises:
   determining the existence of one or more faces comprising an axis; and
   selecting the axis as the second definition.

4. The method of claim 1, wherein determining the first definition for the selected first datum comprises:
   determining the existence of one or more faces comprising a plane; and
   selecting the plane as the first definition.

5. The method of claim 1, wherein determining the second definition for the selected second datum comprises:
   determining the existence of one or more faces a plane; and
   selecting the plane as the second definition.

6. The method of claim 1, wherein determining the first definition for the selected first datum comprises:
   determining the existence of three or more targets comprising a plane; and
   selecting the plane as the first definition.

7. The method of claim 1, wherein determining the second definition for the selected second datum comprises:
   determining the existence of three or more targets comprising a plane; and
   selecting the plane as the second definition.

8. The method of claim 2, wherein automatically determining the set of one or more valid second datums based on the determined first definition comprises selecting a plane, wherein the scalar product of the normal of the plane and the axis is zero, one, or negative one.

9. The method of claim 2, wherein the axis comprises a first axis and automatically determining the set of one or more valid second datums based on the determined first definition comprises selecting one or more second datums based on the determined first definition comprises determining one or more second axes, wherein the scalar product of the first axis and the second axis is zero or the scalar product of the first axis and the second axis is one or negative one and the first axis and the second axis are not coaxial.

10. The method of claim 4, wherein automatically determining the set of one or more second valid datums based on tie determined first definition comprises:
    calculating the normal of the plane, wherein the plane comprises a first plane; and
    selecting a second plane, wherein the scalar product of the normal of the second plane and the normal of the first plane is zero.

11. The method of claim 4, wherein automatically determining a set of one or more valid second datums based on the determined first definition comprises:
    calculating the normal of the plane; and
    selecting an axis, wherein the scalar product of the axis and the normal of the first plane is zero, one, or negative one.

12. The method of claim 8, wherein automatically determining the set of one or more valid third datums based on the determined second definition comprises:
    calculating the normal of the plane, wherein the plane comprises a first plane; and
    selecting a second plane, wherein the scalar product of the normal of the second plane and the normal of the first plane is zero and the scalar product of the normal of the first plane and the axis is one or negative one and the scalar product of the axis and the second plane is zero.

13. The method of claim 10, wherein automatically determining the set of one or more valid third datums based on the determined second definition comprises selecting a third plane wherein the scalar product of the normal of the first plane and the normal of the second plane is zero and the scalar product of the normal of the first plane and the normal of third plane is zero and the scalar product of the normal of the second plane and the normal of third plane is zero.

14. The method of claim 1, wherein the first datum, the second datum, and the third datum are selected from a group of the following:
    a plane;
    a slot;
    a pin;
    a tapered pin;
    an elongated hole;
    a torus;
    a ball/socket;
    a revolved;
    a bounded; and
    a thickness.

15. A computer-implemented system for creating a datum reference frame, the system comprising logic encoded in media and operable to:
    select a first datum, wherein the first datum comprises a plurality of faces;
    determine a first definition for the selected first datum;
    automatically determine a set of one or more second valid datums based on the determined first definition, wherein the second datum comprises a plurality of faces;
    select the second datum from the set of valid second datums;

determine a second definition for the selected second datum;

automatically determine a set of one or more valid third datums based on the determined second definition, wherein the third datum comprises a plurality of faces; and select the third datum from the set of valid third datums.

16. The system of claim 15, wherein logic operable to determine the first definition for the selected first datum comprises logic operable to:

determine the existence of one or more faces comprising an axis; and select the axis as the first definition.

17. The system of claim 15, wherein logic operable to determine the second definition for the selected second datum comprises logic operable to:

determine the existence of one or more aces comprising an axis; and select the axis as the second definition.

18. The system of claim 15, wherein logic operable to determine the first definition for the selected first datum comprises logic operable to determine the existence of one or more faces comprising a plane; and select the plane as the first definition.

19. The system of claim 15, wherein logic operable to determine the second definition for the selected second datum comprises logic operable to:

determine the existence of one or more faces a plane; and select the plane as the second definition.

20. The system of claim 15, wherein logic operable to determine the first definition for the selected first datum comprises logic operable to:

determine the existence of three or more targets comprising a plane; and select the plane as the first definition.

21. The system of claim 15, wherein logic operable to determine the second definition for the selected second datum comprises logic operable to:

determine the existence of three or more targets comprising a plane; and select the plane as the second definition.

22. The system of claim 16, wherein the logic operable to automatically determine the set of one or more valid second datums based on the determined first definition comprises logic operable to select a plane, wherein the scalar product of the normal of the plane and the axis is zero, one, or negative one.

23. The system of claim 16, wherein the axis comprises a first axis and the logic operable to automatically determine the set of one or more valid second datums based on the determined first definition comprises logic operable to select one or more second datums based on the determined first definition comprises determining one or more second axes, wherein the scalar product of the first axis and the second axis is zero or the scalar product of the first axis and the second axis is one or negative one and the first axis and the second axis are not coaxial.

24. The system of claim 18, wherein the logic operable to automatically determine the set of one or more valid second datums based on the determined first definition comprises logic operable to:

calculate the normal of the plane, wherein the plane comprises a first plane; and select a second plane, wherein the scalar product of the normal of the second plane and the normal of the first plane is zero.

25. The system of claim 18, wherein the logic operable to automatically determine the set of one or more valid second datums based on the determined first definition comprises logic operable to:

calculate the normal of the plane; and select an axis, wherein the scalar product of the axis and the normal of the first plane is zero, one, or negative one.

26. The system of claim 22, wherein the logic operable to automatically determine the set of one or more valid third datums based on the determined second definition comprises logic operable to:

calculate the normal of the plane, wherein the plane comprises a first plane; and select a second plane, wherein the scalar product of the normal of the second plane and the normal of the first plane is zero and the scalar product of the normal of the first plane and the axis is one or negative one and the scalar product of the axis and the second plane is zero.

27. The system of claim 24, wherein the logic operable to automatically determine the set of one or more valid third datums based on the determined second definition comprises logic operable to select a third plane wherein the scalar product of the normal of the first plane and the normal of the second plane is zero and the scalar product of the normal of the first plane and the normal of third plane is zero and the scalar product of the normal of the second plane and the normal of third plane is zero.

28. The system of claim 15, wherein the first datum, the second datum, and the third datum are selected from a group of the following:

a plane;

a slot;

a pin;

a tapered pin;

an elongated hole;

a torus;

a ball/socket;

a revolved;

a bounded; and a thickness.

* * * * *